Sept. 18, 1945. R. F. DREIFKE 2,385,063
LANDING GEAR LOCK
Filed July 26, 1943 2 Sheets-Sheet 1

INVENTOR
RAYMOND F. DREIFKE
BY
ATTORNEY

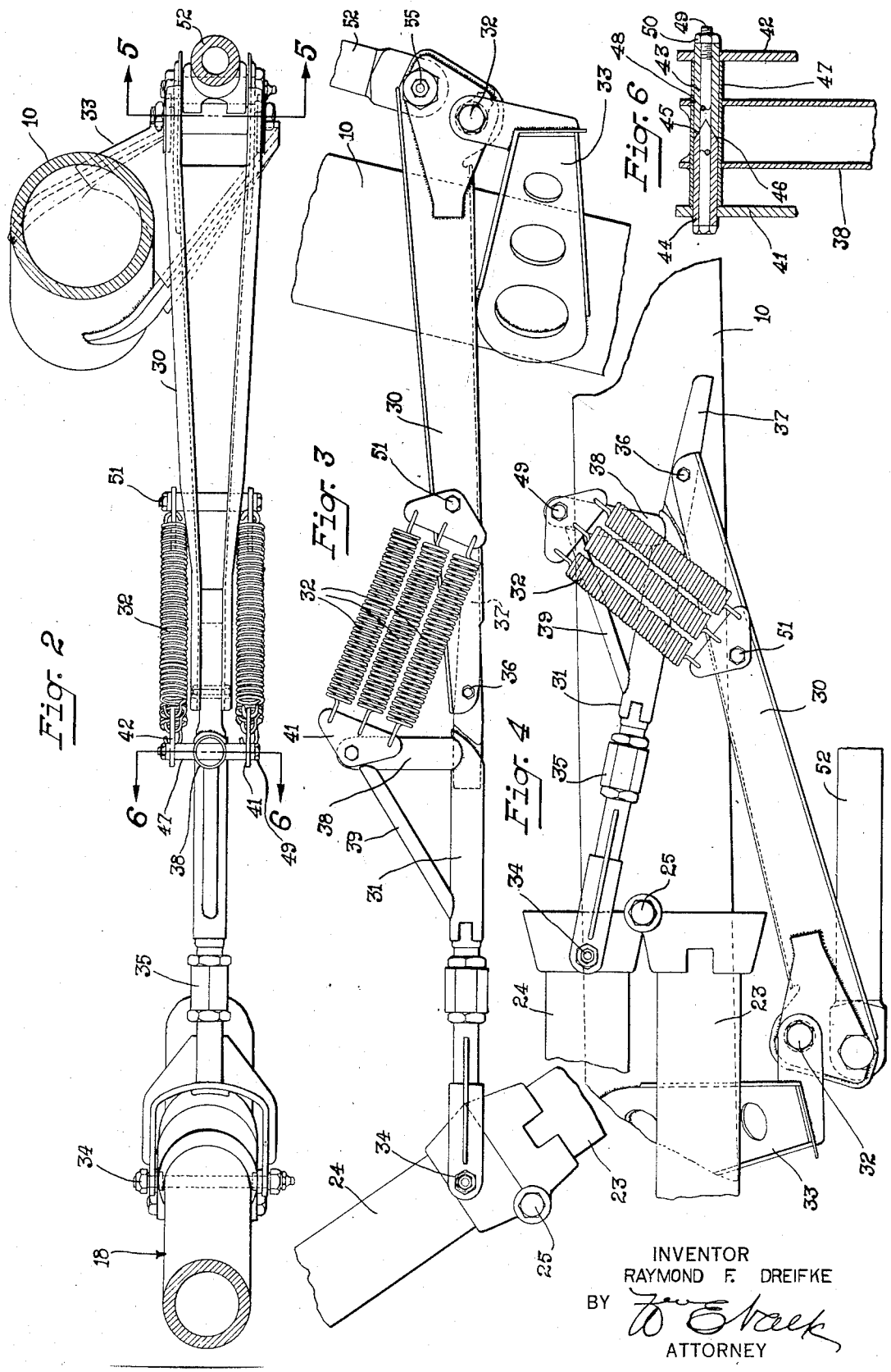

Patented Sept. 18, 1945

2,385,063

UNITED STATES PATENT OFFICE 2,385,063

LANDING GEAR LOCK

Raymond F. Dreifke, St. Louis, Mo., assignor to Curtiss-Wright Corporation, a corporation of Delaware Application July 26, 1943, Serial No. 496,235

2 Claims. (Cl. 244—102)

This invention relates to retractable landing gear for airplanes and more particularly to means for locking the foldable strut thereof when the landing gear is down.

In the usual landing gear arrangement, the complicated electrical or hydraulic systems used to lock the foldable strut in the down position, are costly, require conduits and swivel connections, are difficult to maintain and the parts thereof are often inaccessible.

It is an object of the present invention to provide a locking device for landing gear which is simple in construction, cheap to build, easy to install, and readily accessible for inspection and repair.

It is another object of the invention to provide a locking device wherein the usual conduits and swivel connections are not needed for its operation.

It is still another object of the invention to provide a locking device which, in addition to serving as a lock, actually assists in forcing the gear into its locked down position.

According to the present invention, a pair of toggle links are connected to the foldable strut adjacent the pivot connection of the two arms of the same and to the shock strut. Groups of springs serve to throw the toggle links into over center position and in so doing, forcibly straighten the arms of the foldable strut to put thereby the landing gear into its final down position. Thus, the lock springs themselves assist in the lowering of the landing gear. A power retracting unit is connected to the landing gear struts through one of the toggle links of the locking device at a point rearwardly of the pivotal connection of the toggle link to the shock strut so that force is taken directly from the unit to return the toggle links from their locked over center position to permit the retraction of landing gear. Means is provided in the connection of the toggle springs to the toggle links whereby if any of the springs are broken, the pulling force of the other springs is not disturbed.

For other objects and for a better understanding of the invention, reference may be had to the following detailed description taken in connection with the accompanying drawings, in which Fig. 1 is a fragmentary perspective view of the landing gear in its retracted position and its connection to an airplane wing structure, the landing gear in its down position being indicated in broken lines.

Fig. 2 is an enlarged plan view of the locking device.

Fig. 3 is an elevational view of the locking device.

Fig. 4 is also an elevational view of the device but showing the parts thereof in a collapsed position and with the brace strut folded into its retracted position.

Fig. 6 is an enlarged sectional view of the means for connecting the toggle springs to the toggle links.

Figure 1:
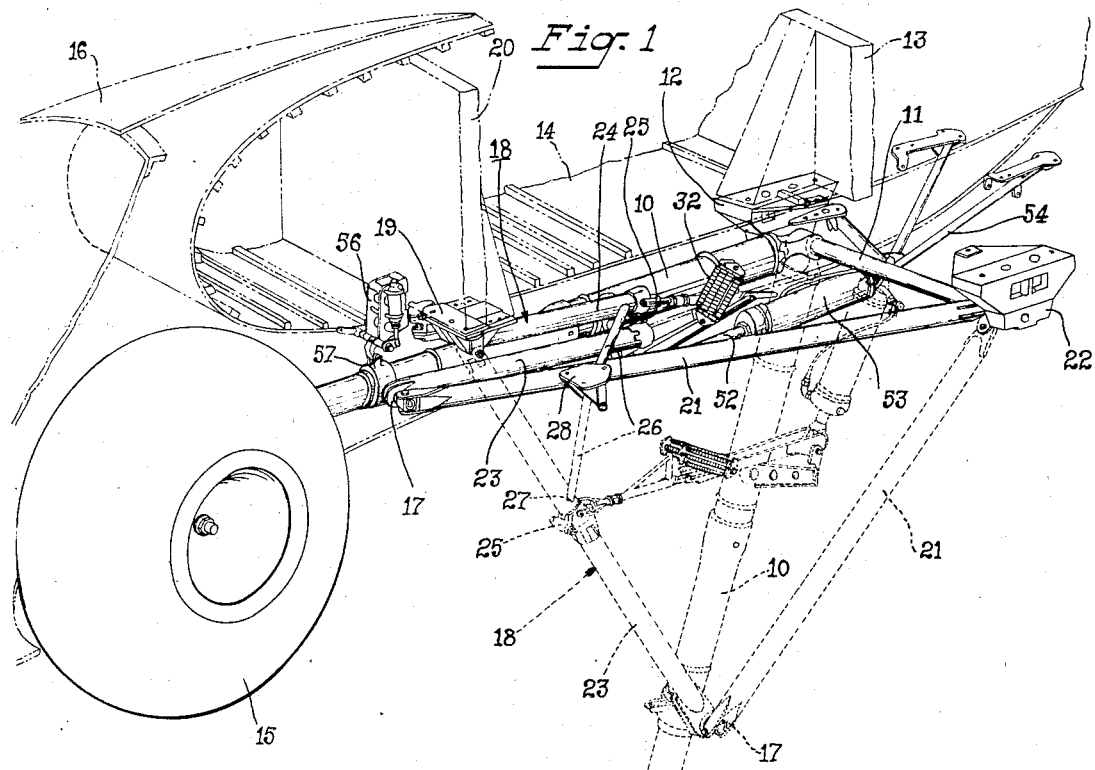

Referring now to the figures, the landing gear is comprised of a main hydraulic shock strut 10 which pivots about an axis 11, carried in a suitable pivot support member 12 on a rear spar 13 of an aircraft wing structure 14. A wheel 15 mounted on the ground end of the shock strut 10 is of a usual construction, and is adapted to fit, when the landing gear is retracted, within engine cowling 16 on the wing structure 14.

To one side of shock strut 10 and some distance from the wheel end thereof, is shown the pivotal connection 17 for a two-part foldable drag or brace strut 18. The drag strut 18 is pivotally connected to a pivot support member 19 on a forward wing spar 20 of the wing structure 14. A brace strut 21, positioned laterally and angularly of the shock strut 10, is pivoted at 17 and also in the pivotal axis 11 for the shock strut 10 adjacent a laterally spaced support member 22 in alignment for connection to rear spar 13. The drag or brace strut 18 consists of a lower link arm 23 and an upper link arm 24 pivotally connected at a knee joint 25 intermediate the span of the arms when straightened. For the purpose of lateral rigidity of upper arm 24, a brace 26 is provided. This brace 26 is welded to arm 24 at 27 and the opposite end is pivoted to a support member 28. It should now be apparent that when the knee joint 25 is bent inwardly, the main shock strut 10 can be rotated forwardly and upwardly to accomplish the retraction of the entire gear. At the same time drag strut arms 23 and 24 fold inwardly and finally assume a folded position as shown in Figs. 1 and 4. The knee pivot 25 scribes an arcuate path about pivotal support 19 and comes to rest at the new position.

Coming now to the principal feature of the present invention, there is a system of toggle links and co-acting springs which together are capable of locking the knee joint 25 from any unintended breaking action during landing and take-off periods. The link-spring system is also capable of aiding in the knee break action during the retraction of the landing gear. However, this latter feature is available only after an outside and controllable force has moved the link-spring system beyond the limits of its locking position. Structurally, the system consists of links 30 and 31 and a set of six coil springs 32 in groups of three which are positioned respectively upon each side of the links, Fig. 2. The link 30 is of U- or channel-shaped cross section and is pivoted at 32 to a bracket 33 welded on the shock strut 10 intermediate the length thereof. Link 31 is pivoted at 34 to the upper drag strut arm 24 and an adjustable threaded coupling 35 is provided on this link to permit length adjustments. A pivot connection 36 between links 30 and 31 is effected through the provision of a nose portion 37 welded on link 31 and adapted to fit or nest within the U-shaped link 30, Figs. 3 and 4.

The foregoing link system acts as a toggle and in which a set of toggle springs acts above the pivot 36 to force the links 30 and 31 into locking position. In order to permit the toggle springs 32 to operate overcenter, a short post 38 and brace member 39 are welded to the link 31 as shown. A pair of spring anchor plates 41 and 42 are then pivotally mounted at the upper end of the short post 38, Fig. 6. These plates 41 and 42 are welded to a split trunnion tube, the two halves of which are indicated at 43 and 44. Alignment of these trunnion halves is achieved by providing a V-slot 45 in part 43 and a mating V-projection 46 in part 44. This trunnion is carried in a tubular journal 47 which is inserted and welded in a suitable aperture 48 in the end of brace 39. A thru-bolt 49 and nut 50 secure this trunnion and spring anchor plate unit in assembly.

The cooperation between the two groups of springs 32, which has been achieved through the inter-locked trunnion elements 43 and 44, is an important feature of the locking system. The full effect of each spring 32 is obtained only when its extended length is substantially maintained. Thus, considering only the spring group acting on trunnion part 43 and with this trunnion part free of locking engagement with part 44, when all three springs are fully operating, the system is symmetrical and balanced. But if one of the outside springs should break, then the remaining two springs would rotate the plate and thus shorten the springs to an extent sufficient to decrease the holding force thereof. Hence, any realignment of these springs such that their set length is decreased lessens the locking force on the links 30 and 31. With each set of springs locked together by means of the trunnion lock 43—44, damage to any one or more springs on either side does not disturb the full force of the remaining springs to any harmful extent. It should also be noted that the combined spring load, tending to maintain links 30 and 31 in axial alignment, has been chosen so that rough landings or manual efforts to raise the link pivot 36 will be prevented. Furthermore, substantially all of the forces acting on links 30 and 31 are either tension or compression. Hence, the bending forces at pivot 36 are theoretically zero. Consequently, the spring force could be reduced to almost the zero point for adequate locking. But due to unforeseen shocks and unusual forces, the spring force is rather large or approximately 150 pounds. An identical arrangement of spring anchor plates and trunnion elements is also provided on the link 30 at 51. Thus, the toggle springs are positioned to permit the link pivot 36 to pass upwardly therebetween.

Figure 5:
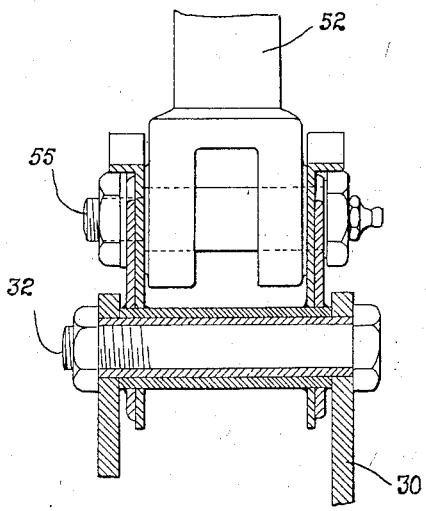
Fig. 5 is an enlarged sectional view of the connection of the locking device to the shock strut as taken on line 5—5 of Fig. 2.

The toggle link 30 is adapted to be rotated about pivot 32 by means of piston rod 52 of a main retracting piston-cylinder unit 53, which expands upon retraction of the landing gear and collapses upon extension of the landing gear. The unit 53 is carried on bracing structure 54 such that the entire unit may pivot with respect thereto. The piston rod 52, in turn, is affixed to the link 30 at a pivot 55, Fig. 5. Considering the action of the retracting cylinder unit 53, it is evident that the first action in retraction is to rotate link 30 about pivot 32 in a clockwise direction (Fig. 3) through a sufficient arc to carry the link pivot 36 above the line of force of the springs 32. During the time the toggle is being broken, the knee joint 25 is also being broken. Once the toggle links 30 and 31 and drag strut 18 have been broken, the cylinder unit 53 acts to retract the whole gear, and the same is moved to the full line position shown in Figs. 1 and 4.

The force system of the retracting unit 53, the link system 30 and 31, and the springs 32 will now be examined so that the function of the several elements will be clear. In the landing position of the gear, the links 30 and 31 form a straight arm such that the pivots 34, 36, and 32 are all in the same line. The force direction of springs 32 may be taken as acting in a line drawn between pivots 49 and 51, and since this force line is above the line 34—36—32, the spring force acts through post arm 38 to produce a negative or locking rotational moment about pivot 36. Upon retraction unit 53 exerts a positive force at 55; and since this force is behind the pivot 32 of link 30, a positive or unlocking rotational movement is produced in link 30. The opposition to the retracting unit force by the toggle spring force will exist until the pivotal point 36 between links 30 and 31 has been moved upwardly to a location above the spring force line between pivots 49 and 51. At this latter position of pivot 36, the spring forces assist the retracting unit 53 in the collapse of the locking link and drag strut system. In the retracted position, the landing gear is retained by a hydraulic latch mechanism 56 engageable with a pin 57 on the shock strut 10.

It should now be apparent that there has been provided a locking device for the foldable strut of landing gear which is cheap to construct, easy to install, and readily accessible for inspection and repair.

While various changes may be made in the detail construction, it shall be understood that such changes shall be within the spirit and scope of the present invention as defined by the appended claims.

I claim as my invention:

1. In an airplane, a supporting structure, a retractable landing gear connected to the supporting structure, said landing gear including a shock strut and a foldable brace strut for bracing the shock strut in its down position, said foldable brace strut having two link arms pivotally connected together, a power unit for retracting the landing gear, and a toggle link arrangement extending between the foldable brace strut and the shock strut for locking the foldable brace strut in its extended and straightened position, said toggle link arrangement including toggle links pivotally connected together and connected respectively to the brace and shock struts, stop means preventing relative movement of the toggle links beyond the slightly over center position, tension springs connected between the toggle links tending to urge the links to a locking position against the stop means when in over center position and tending to urge the links to a collapsed position when short of center position, and said retracting unit for the landing gear connected to one of the toggle links at a point removed from its pivotal connection with one of the struts whereby the power for retracting the landing gear is applied through the toggle link to at first return the toggle links from their over center locking position to thereby unlock the toggle link arrangement.

2. In an airplane, a supporting structure, a retractable landing gear connected to the supporting structure, said landing gear including a shock strut and a foldable brace strut for bracing the shock strut in its down position, said foldable brace strut having two link arms pivotally connected together, a power unit for retracting the landing gear, and a toggle link arrangement extending between the foldable brace strut and the shock strut for locking the foldable brace strut in its extended and straightened position, said toggle link arrangement including toggle links pivotally connected together and connected respectively to the brace and shock struts, stop means preventing relative movement of the toggle links beyond a slightly over center position, a pair of groups of tension springs spaced one above the other and connected between the toggle links tending to urge the links to a locking position against the stop means when in over center position and tending to urge the links to a collapsed position when short of center position, one group being located at one side of the toggle links while the other group is located at the opposite side of the toggle links, and means for so pivotally connecting the groups of springs to the toggle links that the groups are tied together and relative movement of one group with respect to the other group is prohibited, whereby upon breakage or release of any one of the springs, the pulling force of the remaining springs is left unaffected.

RAYMOND F. DREIFKE.